Nov. 17, 1953  H. C. KEYSOR  2,659,596
AXLE ASSEMBLY
Filed April 12, 1952
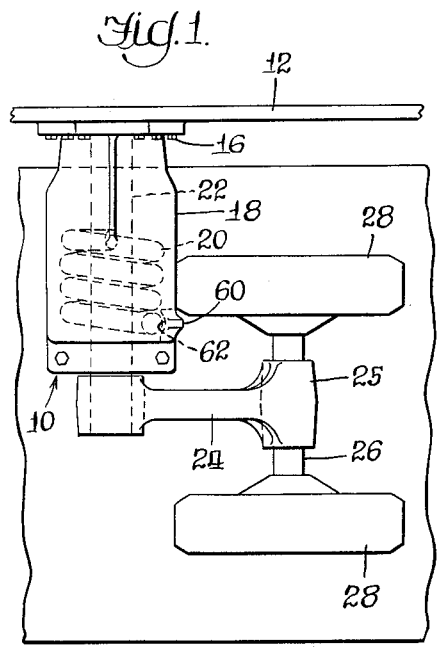
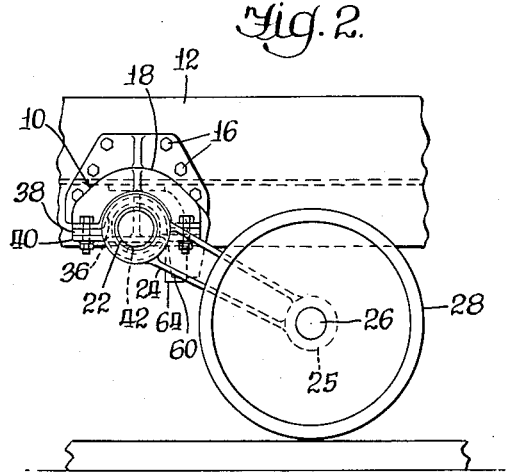
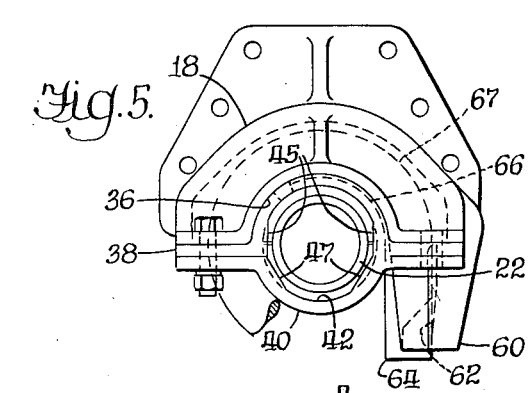
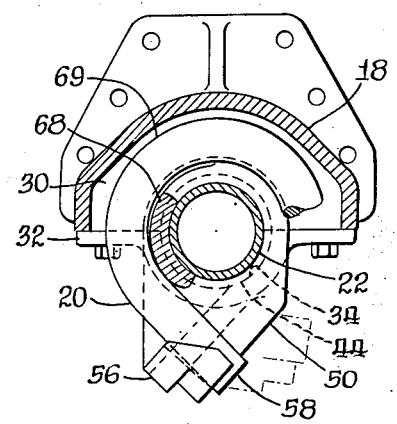
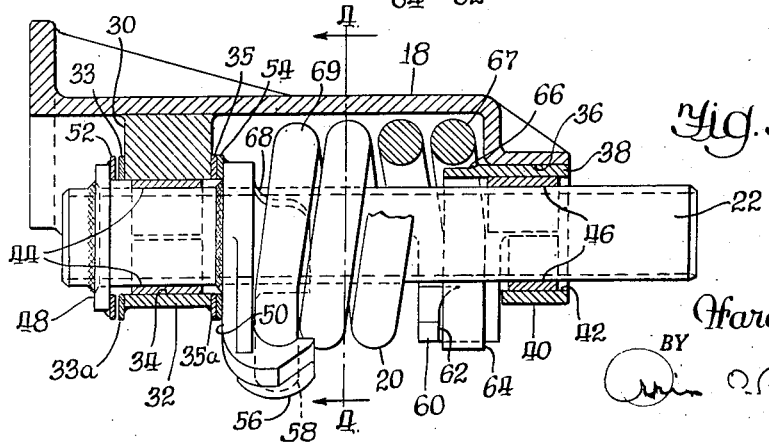
INVENTOR.
Harold C. Keysor
BY
O. B. Garner
Atty.

Patented Nov. 17, 1953

2,659,596

UNITED STATES PATENT OFFICE 2,659,596

AXLE ASSEMBLY

Harold C. Keysor, Chicago, Ill., assignor to American Steel Foundries, Chicago, Ill., a corporation of New Jersey Application April 12, 1952, Serial No. 281,959

6 Claims. (Cl. 267—58)

1

The invention relates to an axle assembly wherein a coiled spring is used to resiliently support a related vehicle body, and more particularly to the method of attaching said spring to said assembly.

It is a general object of my invention to provide a practical, compact "trail type" axle assembly wherein a coiled helical spring is used to flexibly support a related vehicle body.

It is another general object of my invention to provide a novel connection between a helical spring and an axle assembly of the character described, that will remedy some of the difficulties tending to cause failures of said spring.

Still another object of my invention is to provide a novel assembly of the class described that can be readily assembled and disassembled to a related vehicle body.

Other objects of the invention will become apparent in the course of the following description, wherein:

Figure 1 is a plan view of the assembly, only a portion of the related vehicle body being shown;

Figure 2 is a side elevational view of the embodiment of Figure 1;

Figure 3 is a fragmentary side elevational view of the housing shown in Figures 1 and 2;

Figure 4 is a sectional view taken at 4—4 of Figure 3, and

Figure 5 is an end view of the structure shown in Figure 3.

To achieve clarity, certain structural details have been omitted from various views where it is believed such omission does not effect a sufficient disclosure of the invention.

Describing the invention in detail, the axle assembly, generally designated 10, is secured to a side 12 of a related vehicle body, preferably by demountable bolt means 16, however, any fixed connection would suffice. As shown in Figure 1, the assembly consists in part of the cast housing 18 having disposed therein a helical spring 20, and a main shaft 22. The shaft 22 extends outboardly of the housing 18, where fixed connection is made to a throw or crank arm 24, which is disposed to extend transversely of the shaft and approximately paralleling the side 12 of the related body. The throw 24 may be demountably keyed to the shaft 22 or may, if desired, be formed integral therewith. In the preferred form of the invention, as illustrated, another shaft or wheel spindle 26 is fixedly secured to the free end 25 of the throw 24 and is disposed to extend transversely thereof and directionally parallel shaft

2

22. Again, connection between the spindle 26 and the throw 24 may be demountable or integral, as desired. Adjacent each side of the crank arm 24, a wheel 28 is rotatably mounted on the spindle 26 by conventional cup, cone, and bearing means (not shown). However, it should be noted that single wheel construction would satisfy the requirements of the invention.

Figure 2 illustrates the operative position of the related parts of the invention. Note should be taken that the spindle 26, which is also the rotational axis of the related wheels, trails the main shaft 22, hence the designation "trail type" axle assembly, referred to above. Because of the trailing position of the supporting wheel, pressure induced either by loading the carried body or by the wheel striking impediments in the terrain, will cause the wheel to move vertically relative to the vehicle body, that is, to rotate counterclockwise about the axis of the shaft 22. Due to the fixed connection between the spindle 26 and the shaft 22, said shaft will rotate concurrently.

Figures 3 and 4 illustrate the internal construction of the novel axle assembly of the preferred embodiment of the invention. The housing 18 presents, adjacent its inboard end, the transversely disposed and integrally formed bearing block 30, which, together with the demountably secured inboard bearing cap 32, defines the hole 34, having its longitudinal axis aligned with the longitudinal axis of the housing 18, that is, extending transversely of the related vehicle body. Split wear plates 33, 33a and 35, 35a may be welded to the inboard and outboard sides, respectively, of the bearing block 30 and bearing cap 32. Adjacent its outboard end, the housing 18 is formed to present the semi-circular recess 36, which is in complementary reception with the spring shelf support 38, as may be seen in Figure 5. The outboard bearing cap 40 is demountably secured to the housing 18 and forms, with the spring shelf support 38, a hole 42, which has a longitudinal axis common with the mentioned axis of the hole 34. Split bearing inserts 44 and 46 are received between holes 34 and 42, respectively, and offer snug rotatable support or journaled connection for the related ends of the main shaft 22. Ledges 45 and 47 are formed as cords in the outboard edge of the circular hole 42, defined between spring support 38, and the outer bearing cap 40. Said ledges 45 and 47 act as retainers preventing the split bearing inserts 46 from moving outboardly on the shaft 22.

An upstanding flange, or lateral stop washer 48, is formed or welded adjacent the inboard end of the shaft 22. Axially spaced from the stop washer 48, a spring clip 50 is rigidly secured to the shaft 22. In the preferred embodiment, the spring clip 50 is upstanding from the peripheral surface of the shaft 22, hence also serves as a lateral stop for said shaft. Circular wear plates 52 and 54 are secured, as by welding, to adjacent sides of the stop washer 48 and the spring clip 50, so that in the complete assembly, said wear plates 52 and 54 loosely abut the wear plates 33, 33a and 35, 35a, which are secured to the related sides of the bearing block 30 and the bearing cap 32.

The helical coiled spring or spring bar 20, of any desired cross section, is disposed inside the housing 18 and surrounding that portion of the axle 22 intermediate the spring clip 50 and the outboard end of the housing. A lug 56 extends outboardly from the lower end of the spring clip 50, said lug having an arcuate recess formed therein to offer cradled reception for the downwardly directed adjacent end 58 of the spring 20. Adjacent the outboard end of the housing, a lug 60 depends therefrom. An arcuate recess 62 is directed inboardly of the housing within the lug 60 and offers cradled reception for the downwardly directed adjacent end 64 of the coiled spring 20. A shelf 66, of the spring shelf support 38, is telescoped within the inside diameter of the first spring convolution 67 adjacent the outboard end of the housing 18. The shelf 66 is formed and arranged to offer support for a portion of the inside radial surface of said first spring convolution 67, as best seen in Figure 5. Another shelf or ledge 68 is extended outwardly from the spring clip 50 and is telescoped within the first spring coil 69 adjacent said spring clip. Again, the ledge 68 offers partial support for the inside radial surface of the adjacent spring coil 69.

It is to be noted that the spring ends or portions 58 and 64 are downwardly directed and substantially tangential to the arc defined by the coil with which they blend.

In operation, as the wheel is urged to move arcuately about the axis of the main shaft 22, a twist or torque is imparted to said shaft. Due to the rigid connection between the shaft 22 and the spring clip 50, a direct pressure is exerted on the spring clip supported end 58, which tends to carry the spring in the direction of rotation of the shaft. The tendency of the spring 20 to rotate about its own longitudinal axis is resisted by the relatively fixed connection between the spring end 64 and the lug 60 depending from the housing 18. Thus it will be seen that rotation of the shaft 22 is operative to induce a substantially pure bending stress in the spring 20, and the resistance offered the induction of said stress by the spring 20 is operative to flexibly resist rotation of said shaft 22, and consequently flexibly support the carried vehicle body.

I claim:

1. In an axle assembly for supporting a related vehicle body, a housing secured to the body, coaxial bearing means at spaced points on the housing, a shaft disposed outwardly of the related body and rotatably supported by the bearing means, a coiled spring disposed within the housing and surrounding the shaft, a spring clip secured to the shaft and connected to said coiled spring, a ledge extending from the spring clip and telescoped within said spring, a spring shelf connected to the housing remote from said ledge and also telescoped within said spring, and means connecting the spring to the housing whereby axial rotation of the spring is resisted.

2. In a trail type axle assembly having a spring formed of helically disposed coils surrounding the main shaft and the wheel eccentrically carried by the shaft; the combination of a housing offering journaled support for said shaft, a spring clip secured to said shaft, an end of said spring in cradled engagement with the clip, another end of said spring in cradled engagement with said housing, and means adjacent the respective ends of said spring partially supporting the spring on its inner radial surface.

3. An axle assembly, according to claim 2, wherein each of said spring ends is formed integral with and tangential to said spring.

4. In an axle assembly of the type described, the combination with a main shaft, a spindle eccentrically carried by the shaft, and a coiled spring having its inside radial surface surrounding the main shaft; of a housing journally supporting the shaft, said spring being disposed within the housing and having straight portions on its opposite ends tangential to the respective end coils of the spring and in angular relation to the main shaft, a spring clip secured to the shaft and in cradled engagement with one of said portions, said housing offering cradled engagement for the other end portion, and ledges on the clip and housing, respectively telescoped within the spring at opposite ends thereof and partially supporting the inside radial surface of said spring.

5. In an axle assembly of the type described, the combination with a main shaft, a spindle eccentrically carried by the shaft, and a coiled spring having its inside radial surface surrounding the main shaft; of a housing journally supported the shaft, said spring being disposed within the housing and having straight cylindrical portions on its opposite ends tangential to the respective end coils of the spring and in angular relation to the main shaft, a spring clip secured to the shaft and having an arm thereon defining a semicylindrical cradle receiving the straight cylindrical end portion on one end of said spring, said housing having an arm defining a semicylindrical cradle receiving the other end portion of said spring, and ledges on the clip and housing, respectively, telescoped within the spring at opposite ends thereof and partially supporting the inside radial surface of said spring.

6. An axle assembly as described in claim 5, wherein said arms on the housing and clip, respectively, are directed downwardly, and the cradles defined by respective arms face in opposite angular directions relative to the shaft.

HAROLD C. KEYSOR.

References Cited in the file of this patent

UNITED STATES PATENTS

| Number | Name | Date |
|---|---|---|
| 298,016 | Moore | May 6, 1884 |
| 2,227,762 | Ronning | Jan. 7, 1941 |
| 2,426,513 | Linn | Aug. 26, 1947 |

FOREIGN PATENTS

| Number | Country | Date |
|---|---|---|
| 200,874 | Switzerland | Jan. 16, 1939 |
| 342,649 | France | July 13, 1904 |
| 717,634 | Germany | Feb. 19, 1942 |